US008774954B2

(12) United States Patent
Haughay, Jr.

(10) Patent No.: US 8,774,954 B2
(45) Date of Patent: Jul. 8, 2014

(54) PROCESSING DATA SUPPLEMENTARY TO AUDIO RECEIVED IN A RADIO BUFFER

(75) Inventor: Allen Paul Haughay, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 698 days.

(21) Appl. No.: 12/554,075

(22) Filed: Sep. 4, 2009

(65) Prior Publication Data

US 2011/0060430 A1 Mar. 10, 2011

(51) Int. Cl.
*G06F 17/00* (2006.01)

(52) U.S. Cl.
USPC .......................................................... 700/94

(58) Field of Classification Search
USPC ..................... 700/94; 455/3.06; 704/500–504
See application file for complete search history.

(56) References Cited

U.S. PATENT DOCUMENTS

2001/0014210 A1* 8/2001 Kang .............................. 386/96
2004/0267388 A1 12/2004 Perdon
2007/0259649 A1 11/2007 Felder
2009/0064202 A1 3/2009 Lee
2009/0179789 A1 7/2009 Haughay, Jr.
2009/0226148 A1* 9/2009 Nesvadba et al. ............... 386/95
2009/0306985 A1* 12/2009 Roberts et al. ................ 704/258

OTHER PUBLICATIONS

Wikipedia, Radio Data System, http://en.wikipedia.org/wiki/Radio_Data_System, Last Accessed Jun. 13, 2009.
Deitmar Kopitz, RDS: The Radio Data System, pp. 55-72.
RDS Forum, Mar. 2009: RDS is now 25—The Complete History, Available at http://www.rds.org.uk/rds98/pdf/RDS_25_090327_4.pdf, Last Accessed Aug. 21, 2009.
NAB Broadcasters, United States RBDS Standard, Apr. 9, 1998, pp. 1-204.
International Search Report for PCT Application No. PCT/US/2010/046147 dated Feb. 21, 2011, 12 pgs.

* cited by examiner

*Primary Examiner* — Andrew C Flanders
(74) *Attorney, Agent, or Firm* — Blakely, Sokoloff, Taylor & Zafman LLP

(57) ABSTRACT

Systems, methods, and devices for processing supplementary data in a buffered radio stream are provided. In one example, an electronic device capable of processing such supplementary data may include a radio frequency receiver, memory, and data processing circuitry. The radio frequency receiver may be capable of receiving and decoding a radio frequency broadcast signal into an audio signal and an audio-identifying non-audio signal. The memory may be capable of buffering the audio signal. The data processing circuitry may be capable of parsing information from the non-audio signal into an audio-identifying component, which may be inserted into the audio signal buffered in the memory.

15 Claims, 13 Drawing Sheets

PROCESSING DATA SUPPLEMENTARY TO AUDIO RECEIVED IN A RADIO BUFFER

BACKGROUND

The present disclosure relates generally to processing radio frequency (RF) broadcast data and, more particularly, to processing non-audio data that accompanies an audio signal in an RF broadcast signal.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Broadcasters may supply both audio and non-audio data in broadcast radio frequency (RF) signals. Such non-audio data may be encoded using the Radio Data System (RDS) or Radio Broadcast Data System (RBDS) (collectively referred to herein as "RDS") format and may describe the supplied audio data. This RDS data may include, for example, an identification of the broadcasting station, an artist name, title, and/or other information associated with currently-playing audio, such as a song or commercial advertisement. RF receivers that are equipped to decode RDS data may decode the audio-identifying information and display this information as it arrives. Since there may be a substantial delay between various types of audio-identifying data that may be broadcast, information regarding currently-playing audio may not be accurate until a substantial amount of time after currently-playing audio has begun.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices for processing supplementary data into a buffered radio stream. In one example, an electronic device capable of processing such supplementary data may include a radio frequency (RF) receiver, memory, and data processing circuitry. The RF receiver may be capable of receiving and decoding an RF broadcast signal into an audio signal and an audio-identifying non-audio signal. The memory may be capable of buffering the audio signal. The data processing circuitry may be capable of parsing information from the non-audio signal into an audio-identifying component, which may be inserted into the audio signal buffered in the memory.

BRIEF DESCRIPTION OF DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to processing audio and supplementary non-audio radio frequency (RF) broadcast data into a buffered digital stream. In particular, an RF broadcast signal that includes both audio data and supplementary non-audio digital data may be received by an RF receiver in an electronic device. By way of example, the supplementary non-audio digital data may be in the Radio Data System (RDS) or Radio Broadcast Data System (RBDS) (collectively referred to herein as "RDS") format, and may arrive slowly over many seconds of the RF broadcast signal. The electronic device may separate the audio data and the supplementary non-audio digital data and may digitize and buffer the audio data. The supplementary non-audio digital data may not initially be included in the buffered digital audio data. Rather, the supplementary non-audio digital data first may be parsed and collected into a single component that identifies the currently-playing audio. This audio-identifying component may be placed into the buffered digital audio stream. In this way, the supplementary non-audio digital data that identifies the currently-playing audio may be placed at one location in the buffered audio stream, rather than be distributed over many seconds of audio data, as originally broadcast.

With the foregoing in mind, a general description of suitable electronic devices for performing the presently disclosed techniques is provided below with reference to FIGS. 1 and 2. In particular, FIG. 1 is a block diagram depicting various components that may be present in an electronic device suitable for use with the present techniques, and FIG. 2 represents one example of a suitable electronic device, which may be, as illustrated, a handheld electronic device having an RF receiver, memory, and certain data processing capabilities.

Figure 1:
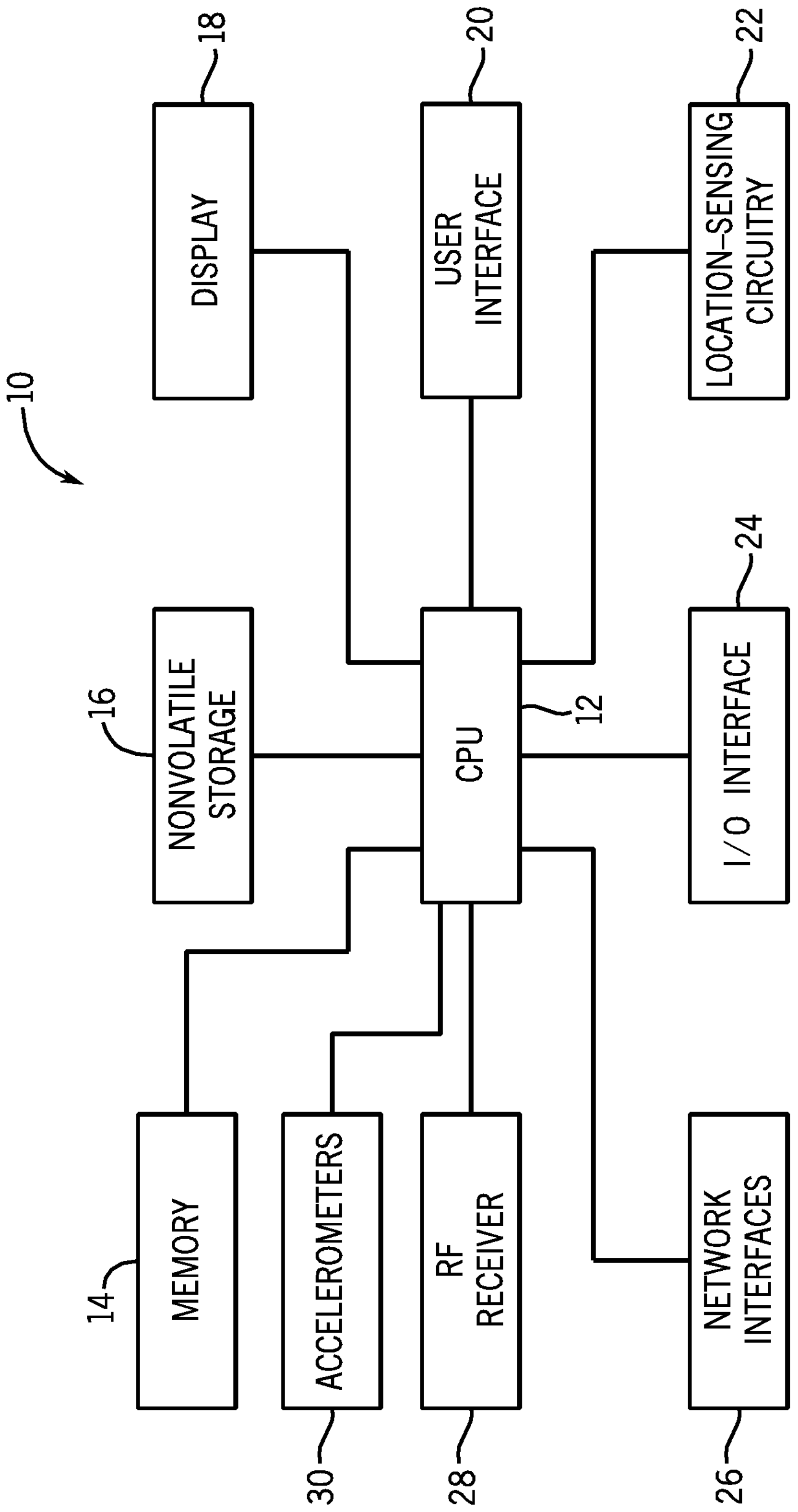
FIG. 1 is a block diagram illustrating an embodiment of an electronic device capable of performing the techniques disclosed herein.
Figure 2:
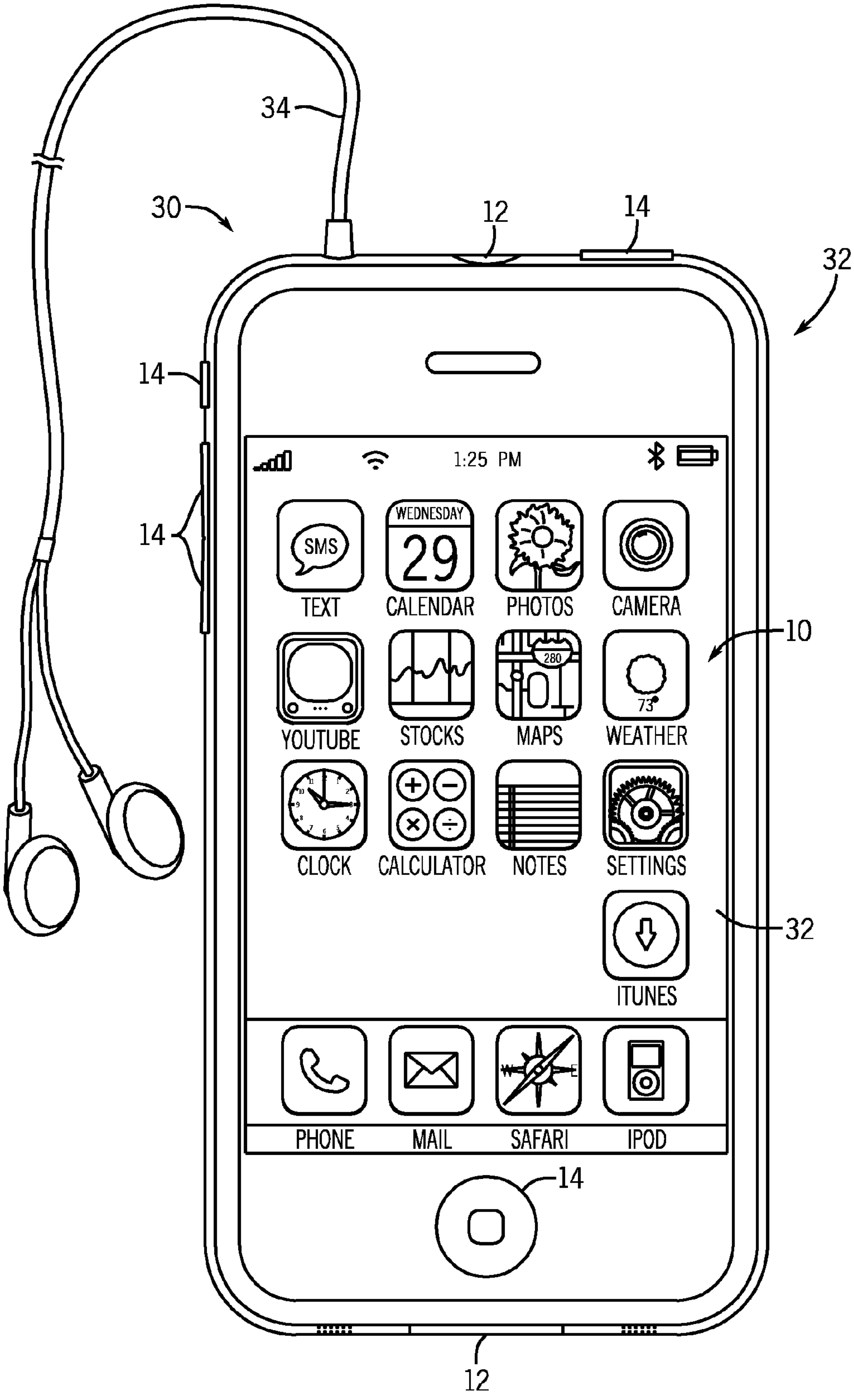
FIG. 2 is a schematic illustration of a handheld embodiment of the electronic device of FIG. 1.

Turning first to FIG. 1, electronic device 10 for performing the presently disclosed techniques may include, among other things, central processing unit (CPU) 12, main memory 14, nonvolatile storage 16, display 18, user interface 20, location-sensing circuitry 22, input/output (I/O) interface 24, network interfaces 26, radio frequency (RF) receiver 28, and accelerometers 30. By way of example, electronic device 10 may represent a block diagram of the handheld device depicted in FIG. 2 or a similar device.

In electronic device 10 of FIG. 1, CPU 12 may be operably coupled to main memory 14 and nonvolatile memory 16 to perform various algorithms for carrying out the presently disclosed techniques. Display 18 may be a touch-screen display, which may enable users to interact with user interface 20 of electronic device 10. Location-sensing circuitry 22 may represent device capabilities for determining the relative or absolute location of electronic device 10. By way of example, location-sensing circuitry 22 may represent Global Positioning System (GPS) circuitry, algorithms for estimating location based on proximate wireless networks, such as local Wi-Fi networks, and/or magnetometer circuitry for estimating a current facial direction of electronic device 10. I/O interface 24 may enable electronic device 10 to interface with various other electronic devices, as may network interfaces 26. Network interfaces 26 may include, for example, interfaces for a personal area network (PAN), such as a Bluetooth network, for a local area network (LAN), such as an 802.11x Wi-Fi network, and/or for a wide area network (WAN), such as a 3G cellular network. Accelerometers 30 may indicate a current movement or orientation of electronic device 10.

Electronic device 10 may receive RF broadcasts using RF receiver 28. RF receiver 28 may receive broadcasts in one or more specific bands of RF spectrum, such as the FM radio band, and may detect both an audio signal and a concurrently-encoded digital signal when tuned to a desired frequency. By way of example, the audio signal may be an analog or digital FM radio signal and the concurrently-encoded digital signal may in the Radio Data System (RDS) or Radio Broadcast Data System (RBDS) (collectively referred to herein as "RDS") format. RF receiver 28 may include analog-to-digital (A/D) circuitry for digitizing analog audio signals or, alternatively, such circuitry may be separate from RF receiver 28. After receiving the RF broadcast signal having the audio component and non-audio components, electronic device 10 may process the signals according to various techniques described below.

FIG. 2 depicts handheld device 32, which may represent one embodiment of electronic device 10. Handheld device 32 may be, for example, a portable phone, a media player, a personal data organizer, a handheld game platform, or any combination of such devices. By way of example, handheld device 32 may be a model of an iPod® or iPhone® available from Apple Inc. of Cupertino, Calif.

Handheld device 32 may couple to headphones 34, which may function as an antenna for receiving broadcast radio frequency (RF) signals. Enclosure 36 may protect interior components from physical damage and to shield them from electromagnetic interference. Enclosure 36 may surround display 18, which may display interface 20. I/O interfaces 24 may open through enclosure 36 and may include, for example, a proprietary I/O port from Apple Inc. to connect to external devices.

User input structures 38, 40, 42, and 44 may, in combination with display 18, allow a user to control handheld device 32. For example, input structure 38 may activate or deactivate handheld device 32, input structure 40 may navigate user interface 20 to a home screen or a user-configurable application screen, input structures 42 may provide volume control, and input structure 44 may toggle between vibrate and ring modes. Microphones 46 and speaker 48 may enable playback of audio and/or may enable certain phone capabilities. Headphone input 50 may provide a connection to headphones 34 and may be operably connected to RF receiver 28, which may be a component within handheld device 32.

Figure 3:
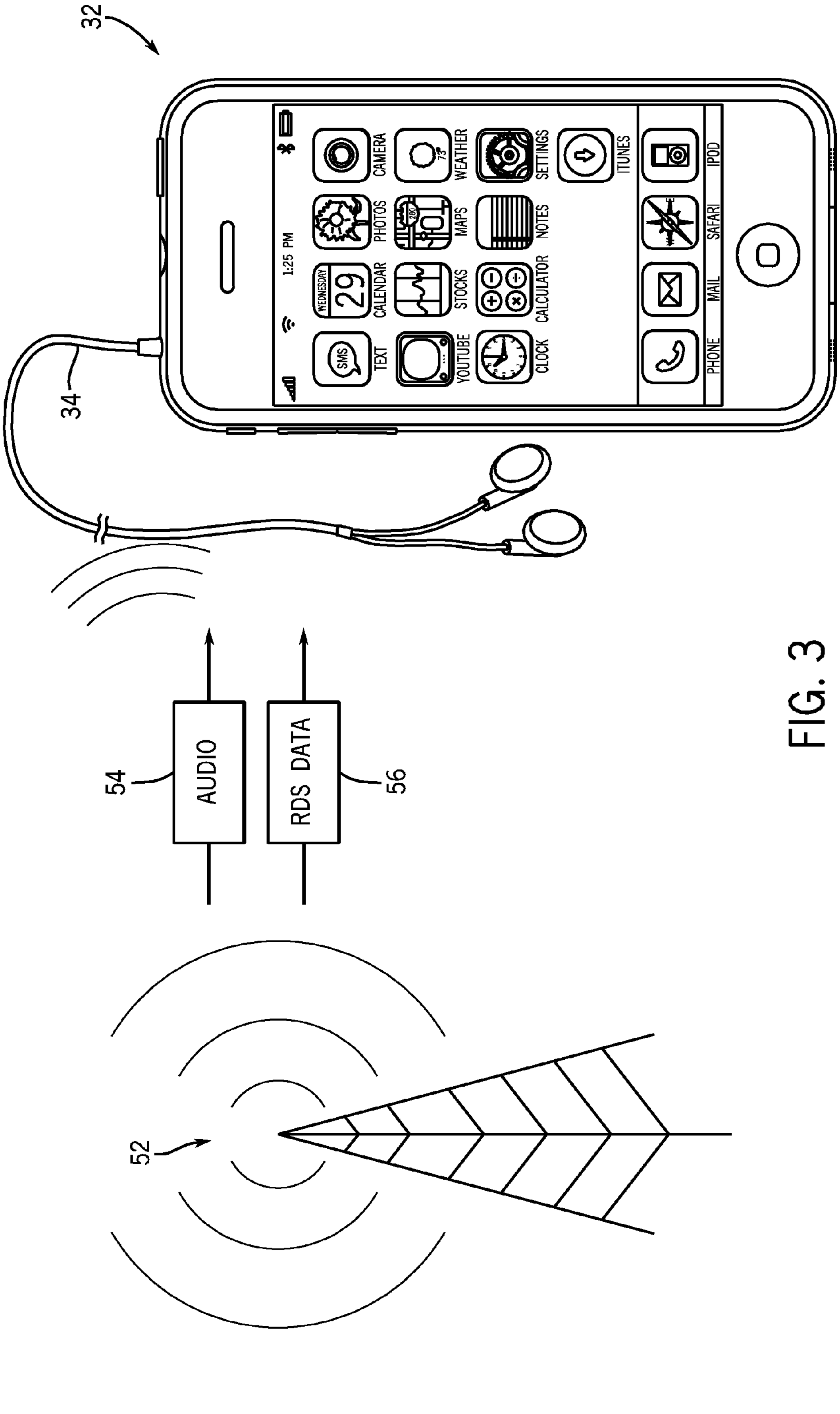
FIG. 3 is a schematic diagram of broadcast data that may be sent to the system of FIG. 2, in accordance with an embodiment.

FIG. 3 is a schematic diagram illustrating a radio frequency (RF) broadcast signal that may be received by electronic device 10. As shown in FIG. 3, RF broadcaster 52 may broadcast an RF signal a specific frequency that includes both audio data 54 and non-audio data, such as digital RDS data 56. By way of example, RF broadcaster 52 may be an FM broadcaster, audio data 54 may be an analog or digital FM radio signal, and digital RDS data 56 may include digital text data or other digital data relating to currently-playing audio in audio data 54. Such digital RDS data 56 may identify currently-playing audio in audio data 54 by listing an artist, a title, and/or a global unique identifier (GUID) for the currently-playing audio. The broadcast audio data 54 and RDS data 56 may be received by handheld device 32, or a similar electronic device 10, via headphones 34 functioning as an FM radio antenna.

Figure 4:
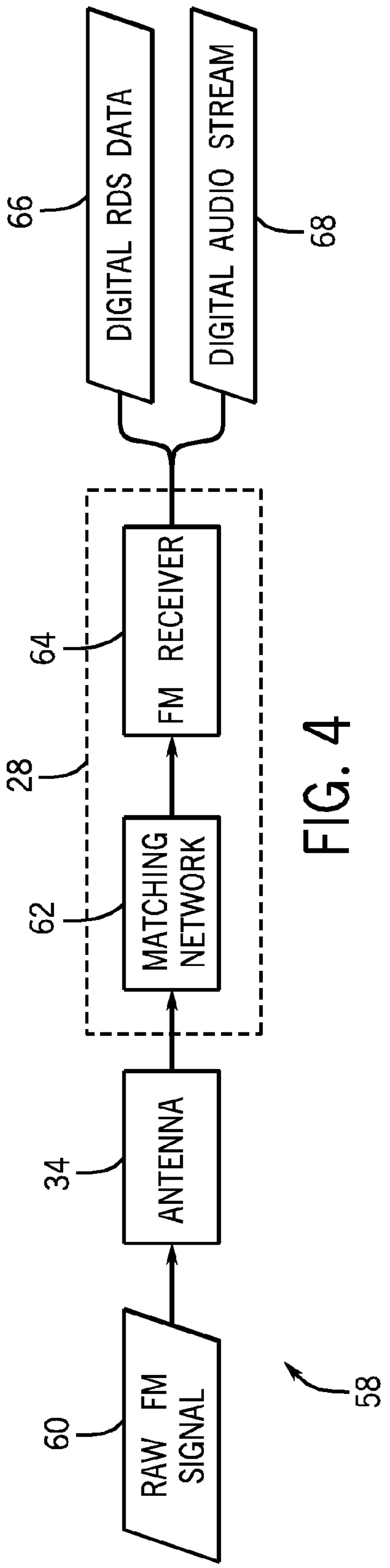
FIG. 4 is a flow diagram representing the reception of radio frequency (RF) broadcast information, in accordance with an embodiment.

Flow diagram 58 of FIG. 4 schematically represents a manner of receiving such a broadcast radio frequency (RF) signal having both audio data 54 and non-audio data, such as digital RDS data 56. Raw RF broadcast signal 60, which may include both audio data 54 and digital RDS data 56, may enter RF receiver 28 of handheld device 32 through antenna 34. Matching network 62 may be selected such that, when coupled to antenna 34, raw RF broadcast signal 60 is efficiently transferred to a specific-band RF receiver, such as FM receiver 64, without excessive noise. FM receiver 64 may process raw RF broadcast signal 60 to obtain digital RDS data 66 and digital audio stream 68. As such, FM receiver 64 may include analog-to-digital (A/D) circuitry for digitizing and/or compressing audio data 54 to obtain digital audio stream 68.

Digital RDS data 66 may include various textual information relevant to audio currently playing in digital audio stream 68. Rather than simply encode digital RDS data 66 into digital audio stream 68 as digital RDS data 66 is received, digital RDS data 66 may be processed into digital audio stream 68 using a variety of techniques. Many such techniques are described below with reference to FIGS. 5-13.

Figure 5:
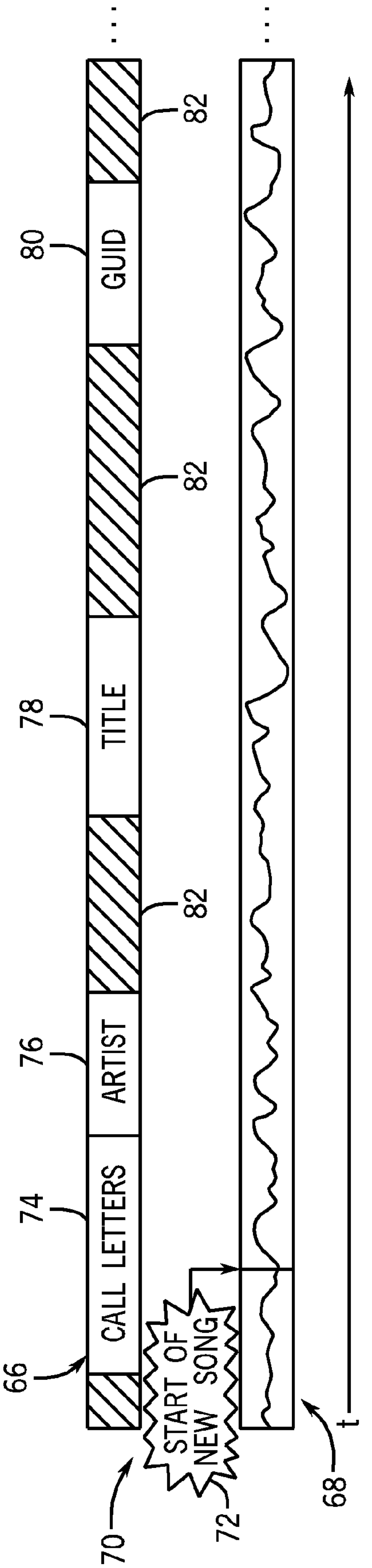
FIG. 5 is a schematic diagram illustrating a manner of processing supplementary digital data and digital audio data from an RF broadcast signal, in accordance with an embodiment.

Process 70 of FIG. 5 illustrates a manner in which streams of supplementary non-audio data, such as digital RDS data 66, and digital audio stream 68 may be received over a span of time. As illustrated by FIG. 5, digital audio stream 68 may represent a continuous stream of digital audio obtained from raw RF broadcast signal 60. From time to time, a change in the audio content currently playing in digital audio stream 68, such as the start of a new song or commercial advertisement, may occur. Point 72 represents such a point in digital audio stream 68. As such, digital RDS data 66 received prior to point 72 may have provided supplementary digital data regarding the audio playing in digital audio stream 68 prior to point 72, and digital RDS data 66 supplied after point 72 may provide supplementary digital data regarding the audio playing in digital audio stream 68 after point 72. As described below, this supplementary digital data may be received over a span of many seconds (e.g., 20-30 seconds). Thus, when digital audio stream 68 begins playing a new song, at point 72, corresponding digital RDS data 66 regarding the new song has not yet been received.

Instead, digital RDS data 66 may arrive gradually via data blocks 74-82. By way of example, block 74 may provide the call letters or other information to identify broadcast station 52, while block 76 may provide the name of the artist of the currently-playing song, block 78 may provide the title of the currently-playing song, and block 80 may provide a global unique identification number (GUID) for the currently-playing song. Such a GUID may provide, for example, a unique reference to the currently-playing song for purchase from an online music vendor, such as iTunes by Apple Inc. Block 82 may represent data not of interest to electronic device 10, which may be disregarded.

If digital RDS data 66 were simply encoded into digital audio stream 68 in the order and time received, blocks 76, 78, and 80, describing the currently-playing song, would be distributed across many seconds of playback time in digital audio stream 68. Under such conditions, to obtain artist, title, and/or GUID upon playback of digital audio stream 68, several seconds may elapse before being fully obtained. Accordingly, various techniques are provided below for processing digital RDS data 66 into digital audio stream 68 such that RDS data 66 may be more readily available upon playback. In particular, the techniques described below may involve parsing digital RDS data 66 and collecting information contained in certain audio-identifying blocks into a single component, which may be a packet or other data structure. The audio-identifying component may be inserted into digital audio stream 68 to identify the currently-playing audio.

Figure 6:
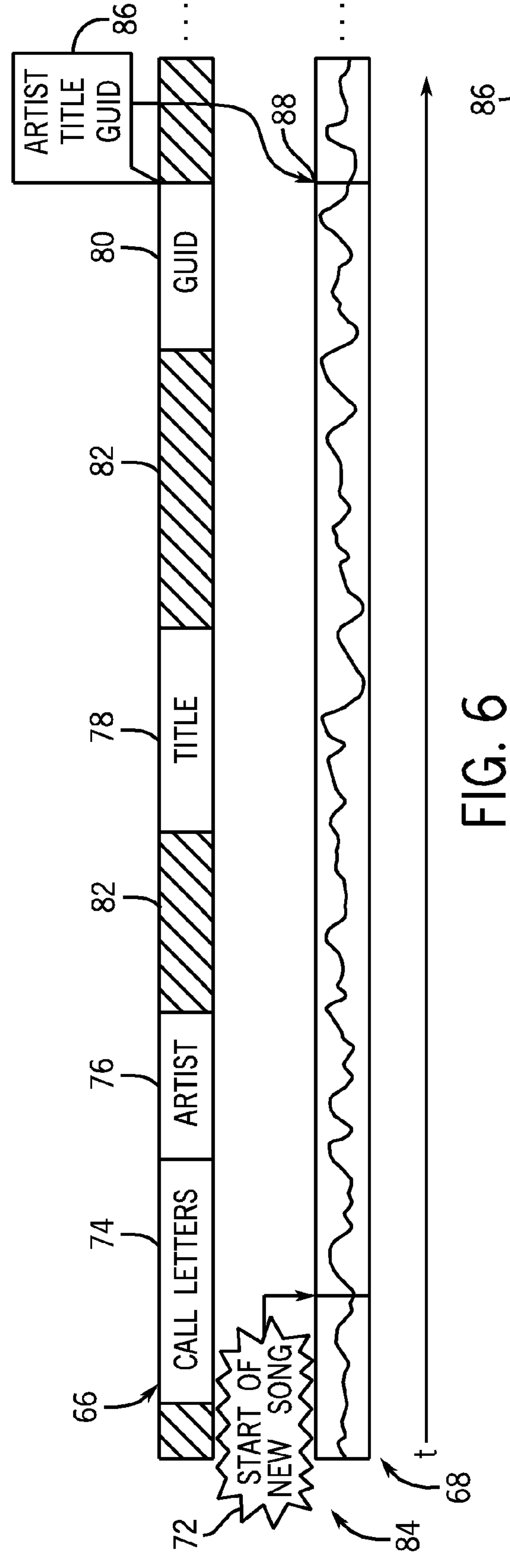
FIG. 6 is a schematic diagram illustrating a manner of processing supplementary digital data from an RF broadcast signal into a buffered digital audio stream, in accordance with an embodiment.
Figure 7:
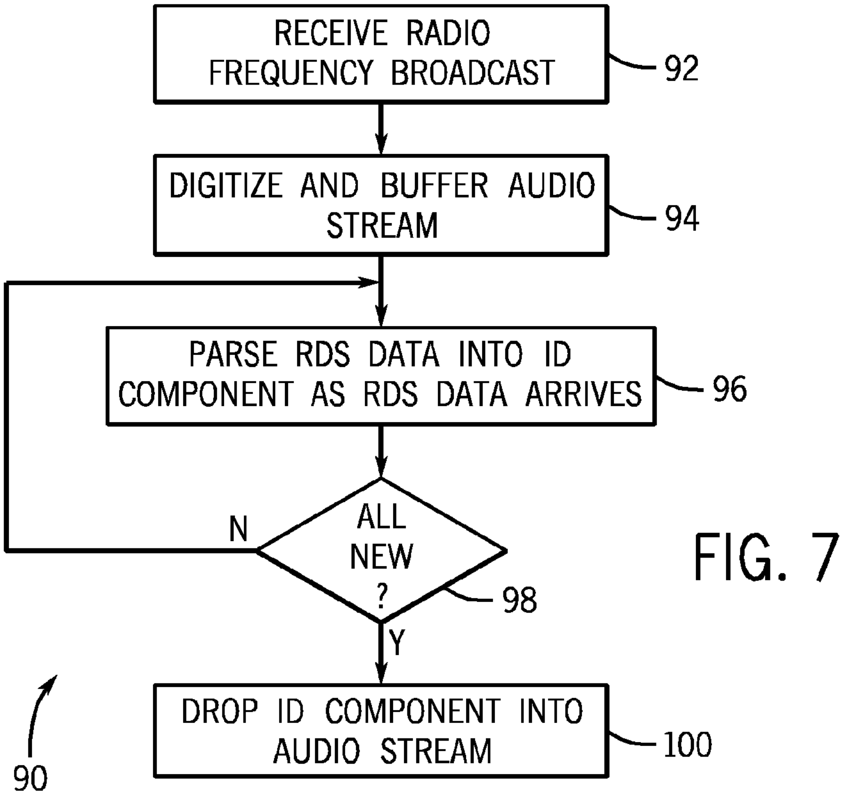
FIG. 7 is a flowchart describing an embodiment of a method for performing the process illustrated by FIG. 6.

FIGS. 6 and 7 describe one such manner of processing digital RDS data 66 into digital audio stream 68. Turning first to FIG. 6, process 84 may involve collecting audio-identifying blocks of RDS data 66 into a single identification (ID) component 86, which may be inserted into digital audio stream 68 once sufficient identifying data have been acquired. In process 84, blocks 76, 78, and/or 80 of digital RDS data 66 may be parsed as they are received, and may provide information relating to the currently-playing audio such as artist, title, and/or GUID. This parsed digital RDS data 66 relating to the currently-playing audio may be collected into ID component 86. ID component 86 may be inserted into digital audio stream 68 as soon as blocks of RDS data 66 all indicate that a new song is playing. Accordingly, in process 84, ID component 86 may be inserted into digital audio stream at point 88. Subsequent RDS data 66 may continue to be parsed, but discarded, until new audio-identifying blocks of RDS data 66 are received, in which case process 84 may repeat for the newly playing audio of digital audio stream 68.

Flowchart 90 of FIG. 7 describes an embodiment of a method for carrying out process 84 of FIG. 6. First step 92 may begin when electronic device 10 receives raw RF broadcast signal 60 from RF broadcaster 52. In step 94, electronic device 10 may obtain digital RDS data 66 and digital audio stream 68 from raw RF broadcast signal 60. In step 96, electronic device 10 may parse received digital RDS data 66 to obtain information regarding the currently-playing audio. For example, electronic device 10 may continuously parse various blocks of digital RDS data 66 into ID component 86.

As indicated by decision block 98, electronic device 10 may continue to parse received digital RDS data 66 in step 96 until the parsed blocks of digital RDS data 66 indicate new audio is now currently playing in digital audio stream 68. For example, if currently-playing audio is defined by an artist, title, and GUID, when the first blocks 76, 78, and 80 received after point 72 have been parsed and collected in ID component 86, step 100 may begin. In step 100, ID component 86 may be placed directly into digital audio stream 68 at point 88, representing a first point at which all blocks of digital RDS data 66 in ID component 86 have indicated that new audio is playing. As described below, electronic device 10 may read ID component 86 during playback of digital audio stream 68 to identify currently-playing audio.

Figure 8:
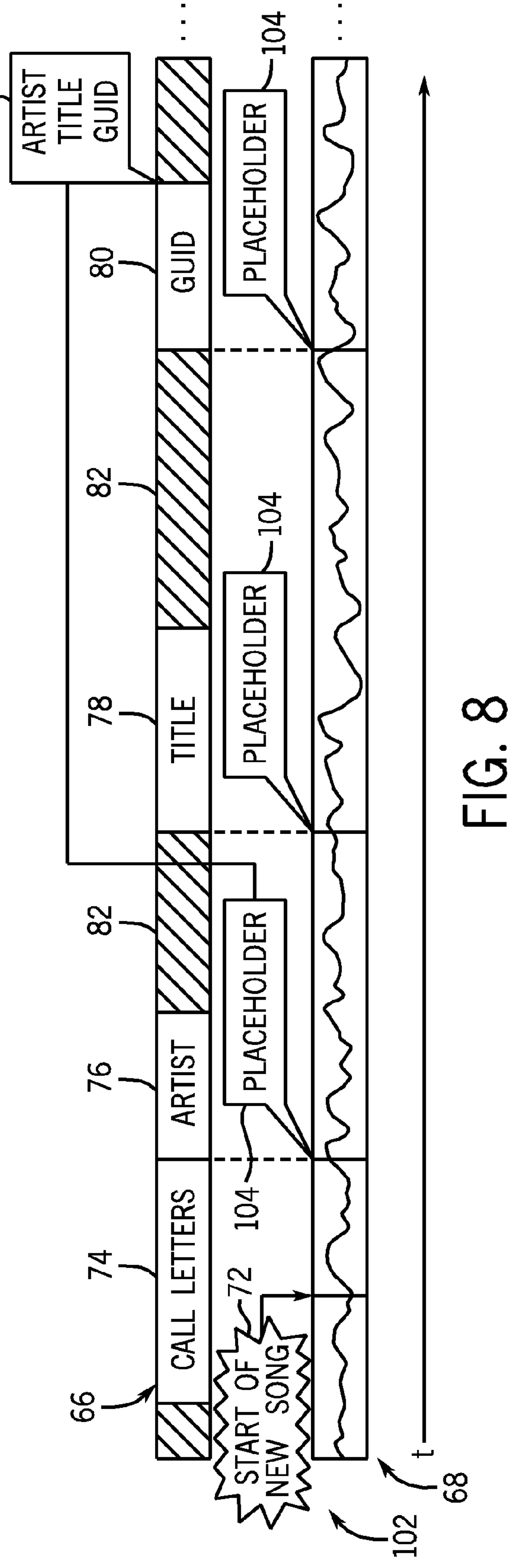
FIG. 8 is a schematic diagram illustrating another manner of processing supplementary digital data from an RF broadcast signal stream into a buffered digital audio stream, in accordance with an embodiment.
Figure 9:
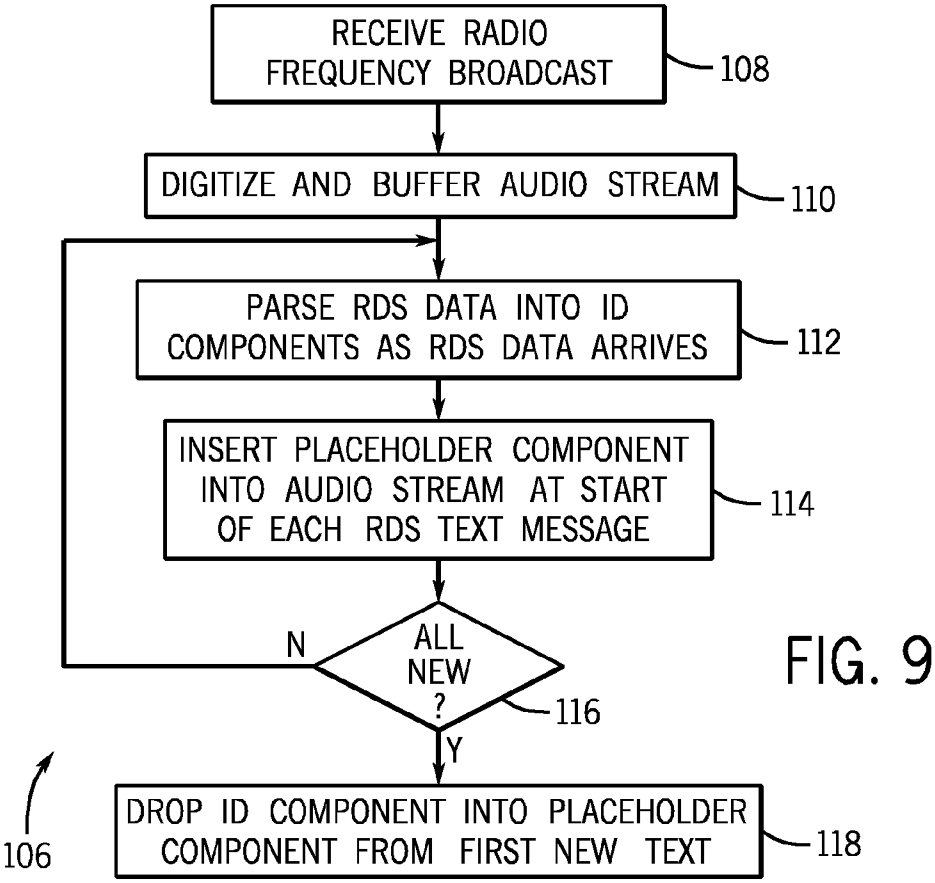
FIG. 9 is a flowchart describing an embodiment of a method for performing the processing illustrated by FIG. 8.

FIGS. 8 and 9 describe another manner of processing supplementary non-audio data, such as digital RDS data 66, into digital audio stream 68 to identify the currently-playing audio. Turning first to FIG. 8, process 102 may represent a manner of processing digital RDS data 66 such that information identifying the currently-playing audio may be inserted into digital audio stream 68 at a first point that new audio-identifying RDS data 66 is received. In particular, as each block 76, 78, and/or 80 of digital RDS data 66 is parsed, electronic device 10 may insert placeholder components 104 into digital audio stream 68. Subsequently, when sufficient audio-identifying information has been obtained from digital RDS data 66 and collected into ID component 86, ID component 86 may be inserted into the placeholder component 104 associated with a first new identifying block 76, 78, or 80. In the example provided by FIG. 8, since block 76 represents the first block of audio-identifying digital RDS data 66 after point 72, the start of the new song, the placeholder component 104 originally inserted at the start of block 76 is used. Block 76 may be identified as the first block of audio-identifying digital RDS data 66 after point 72 because the information contained in the block, artist name, is different from the artist name included in such a block prior to point 72.

In cases where the currently-playing song changes at point 72, but the song is by the same artist as prior to point 72, block 76 may not initially be identified as a first new block. In such cases, after a new title block 78 and/or new GUID block 80, which indicate a change in song, have been received and parsed into audio-identifying ID component 86 and another artist block 76, indicating the same artist name, is received in digital RDS data 66, ID component 86 may be placed into the placeholder component 104 associated with the first block of RDS data 66 definitively associated with the new song after point 72. In the instant example of FIG. 8, the first block of RDS data 66 definitively associated with the new song after point 72 may be title block 78.

Flowchart 106 of FIG. 9 describes an embodiment of a method for performing process 102. Steps 108, 110, and 112 of flowchart 106 of FIG. 9 may be performed in substantially the same manner as steps 92, 94, and 96 of flowchart 90 of FIG. 7. However, as noted by step 114, as each block 76, 78, and/or 80 is parsed, a placeholder component 104 may be inserted into digital audio stream 68. It should be appreciated that placeholder components 104 may additionally or alternatively be inserted into digital audio stream 68 at a time immediately following each block 76, 78, and/or 80, after the received block 76, 78, and/or 80 has been determined to contain audio-identifying information.

When, as indicated by decision block 116, the parsed RDS data 66 of ID component 86 indicates that new audio is currently playing in digital audio stream 68, step 118 may occur. In step 118, ID component 86 may be inserted into one of the previously inserted placeholder components 104. Specifically, ID component 86 may be inserted into the placeholder component 104 previously inserted into digital audio stream 68 at the location in time that first new audio-identifying information was parsed. For example, if artist block 76 is the first block of new audio-identifying digital RDS data 66, the ID component 86 may be inserted in the placeholder component 104 at that point in time.

Figure 10:
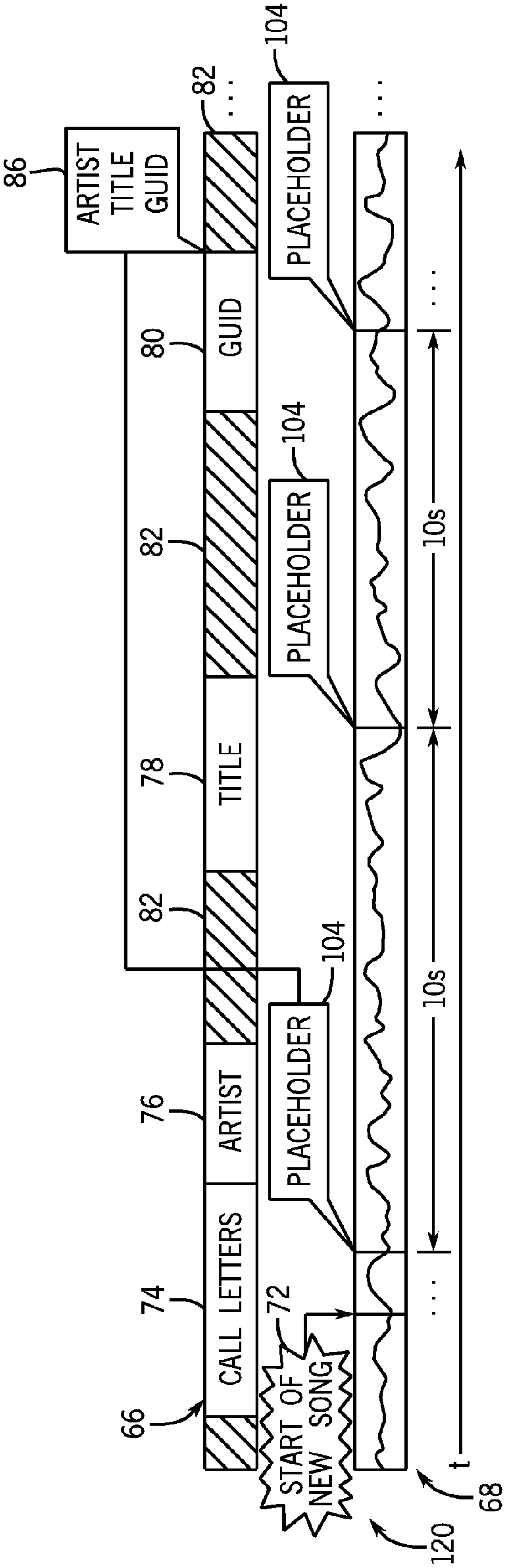
FIG. 10 is a schematic diagram illustrating another manner of processing supplementary digital data from an RF broadcast signal stream into a buffered digital audio stream, in accordance with an embodiment.
Figure 11:
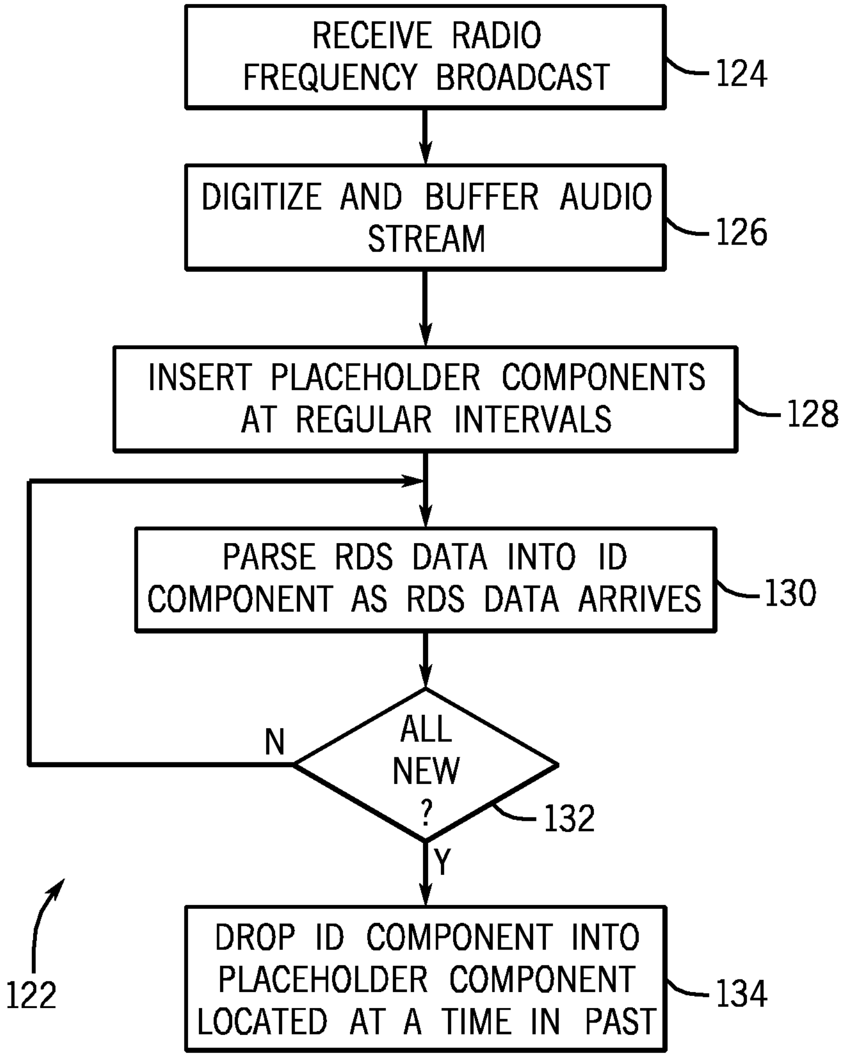
FIG. 11 is a flowchart describing an embodiment of a method for performing the process illustrated by FIG. 10.

FIGS. 10 and 11 represent another manner of processing supplementary non-audio data, such as digital RDS data 66, into digital audio stream 68. Turning first to FIG. 10, process 120 may represent a manner of processing digital RDS data 66 such that information identifying the currently-playing audio may be inserted into digital audio stream 68 via placeholder components 104 inserted into digital audio stream 68 at regular intervals. As illustrated by process 120 of FIG. 10, placeholder components 104 may be packets or other data structures inserted into digital audio stream 68 at regular intervals in time (e.g., approximately every 10 seconds). Meanwhile, electronic device 10 may parse digital RDS data 66 to obtain ID component 86 in the manners described above. When ID component 86 indicates that a new song is currently playing, ID component 86 may be inserted into a placeholder component 104 located a certain amount of time in the past in digital audio stream 68. The amount of time may depend on the typical arrival time of the digital data identifying currently-playing audio of digital audio stream 68. For example, because relevant RDS data 66 may accumulate over a period of 20-30 seconds, ID component 86 may be inserted into the third placeholder component 104 back in time in digital audio stream 68, which may correspond to a time approximately 20-30 seconds in the past. By doing so, ID component 86 may be stored near to point 72, the start of a new song, in digital audio stream 68.

Flowchart 122 of FIG. 11 describes an embodiment of a method for performing process 120 of FIG. 10. Steps 124 and 126 of flowchart 122 of FIG. 11 may be performed in substantially the same manner as steps 92 and 94 of flowchart 90 of FIG. 7. In step 128, as digital audio stream 68 is obtained, placeholder components 104 may be inserted at regular intervals. The regular interval may be approximately 5, 10, 15, 20, 25, or 30 seconds, for example, and may vary depending on the expected rate of reception of digital data identifying currently-playing audio of digital audio stream 68. By way of example, when the digital data identifying currently-playing audio is digital RDS data 66, which may arrive over a period of 20-30 seconds, the regular interval may be approximately 10 seconds. In step 130, various blocks of digital RDS data 66 may be parsed to obtain information relating to the currently-playing audio of digital audio stream 68. These audio-identifying blocks of digital RDS data 66 may be collected into ID component 86.

When all of the data within ID component 86 indicate a new song is currently playing as indicated by decision block 132, step 134 may take place. In step 134, ID component 86 may inserted into one of the placeholder components 104 located in digital audio stream 68 at some time in the past. As noted above, because the RDS data 66 may take approximately 20-30 seconds to provide substantially all information regarding a new song, the placeholder component 104 that is selected may be a placeholder component 104 located approximately 20-30 seconds in the past in digital audio stream 68.

Figure 12:
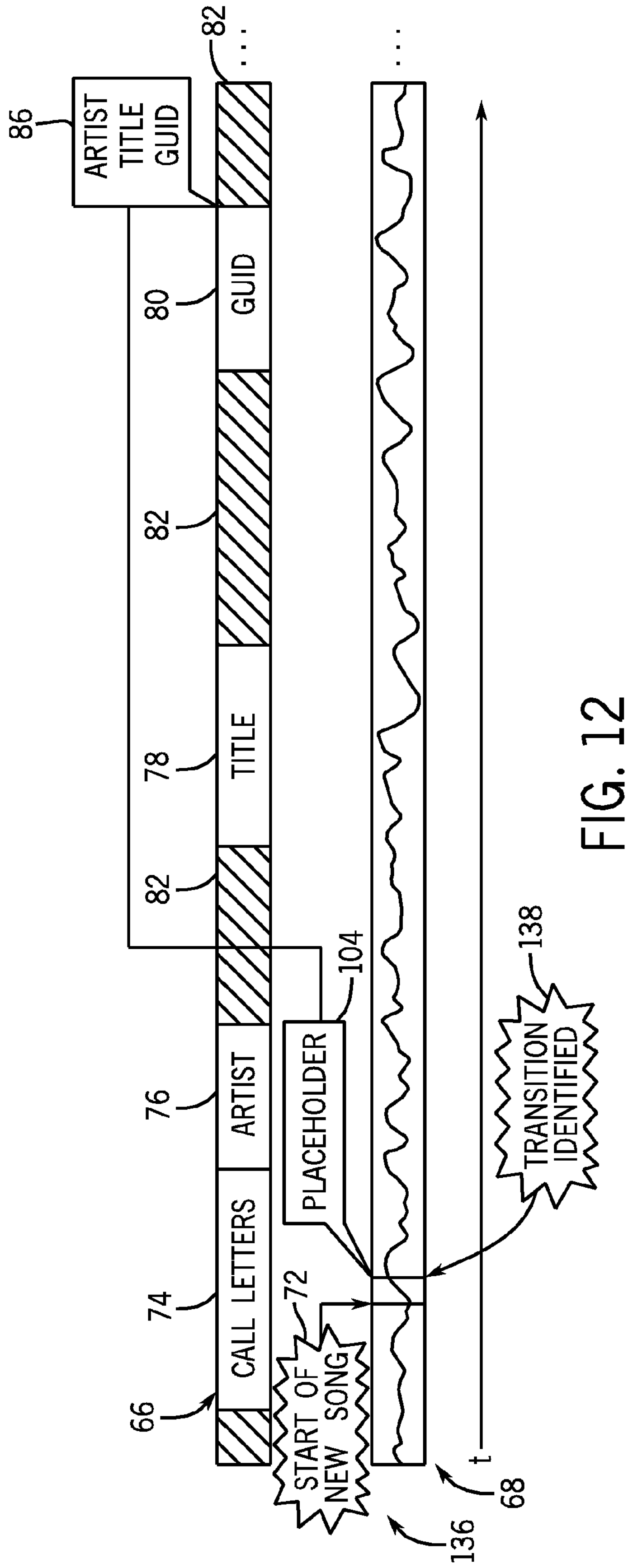
FIG. 12 is a schematic diagram illustrating another manner of processing supplementary digital data from an RF broadcast signal into a buffered digital audio stream, in accordance with an embodiment.
Figure 13:
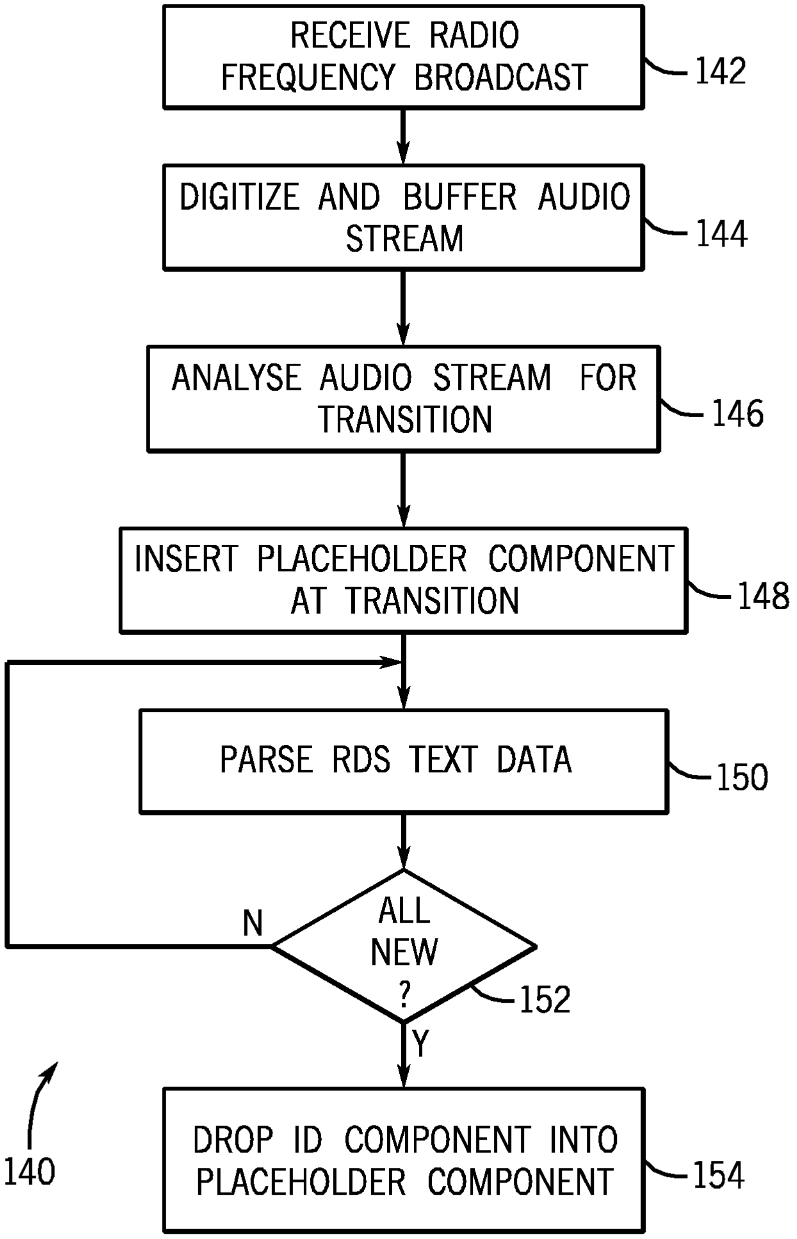
FIG. 13 is a flowchart describing an embodiment of a method for performing the processing illustrated in FIG. 12.

FIGS. 12 and 13 depict another manner of processing supplementary non-audio data, such as digital RDS data 66, into digital audio stream 68. Turning first to FIG. 12, process 136 represents a manner of inserting relevant RDS data 66 into digital audio stream 68 at a point at which a song transition has been identified. To identify a song transition, electronic device 10 may continually or periodically analyze digital audio stream 68 as it is received for variations in audio data that indicate a new song has begun. For example, electronic device 10 may monitor changes in key, beat, frequency, and so forth, to determine when new audio begins to play in digital audio stream 68. When a transition between currently-playing audio is identified, such as at point 138, which may approximate the location of point 72, the actual start of a new song, placeholder component 104 may be inserted into digital audio stream 68. Thereafter, electronic device 10 may parse digital RDS data 66 to obtain ID component 86. When ID component 86 includes sufficient information to identify currently-playing audio in digital audio stream 68, ID component 86 may be inserted into placeholder component 104.

Flowchart 140 of FIG. 13 describes an embodiment of a method for performing process 136 of FIG. 12. Steps 142 and 144 of flowchart 140 of FIG. 13 may be performed in substantially the same manner as steps 92 and 94 of flowchart 90 of FIG. 7. In step 146, electronic device 10 may analyze digital audio stream 68 to determine when new audio begins to play. As noted above, electronic device 10 may analyze digital audio stream 68 for changes in key, beat, and/or frequency to determine transition point 138. It should be noted that step 146 may take place continuously or periodically. If step 146 takes place periodically, electronic device 10 may analyze digital audio stream 68 for such audio changes, for example, every 5, 10, 15, 20, 25, or 30 seconds, to determine transition point 138.

In step 148, after transition point 138 has been determined, electronic device 10 may insert placeholder component 104 at transition point 138 into digital audio stream 68. Electronic device 10 may gradually receive and parse digital RDS data 66, and the blocks of digital RDS data 66 that relate to the currently-playing audio may be collected into ID component 86. When ID component 86 indicates that a new song is playing, as illustrated by decision block 152, step 154 may take place. In step 154, ID component 86 may be inserted into place holder component 104.

As noted above, ID components 86 may be stored in digital audio stream 68 to aid in identifying audio during playback of digital audio stream 68. As such, FIGS. 14-18 describe various manners of identifying the currently-playing audio based on ID components 86 located in digital audio stream 68 during playback.

Figure 14:
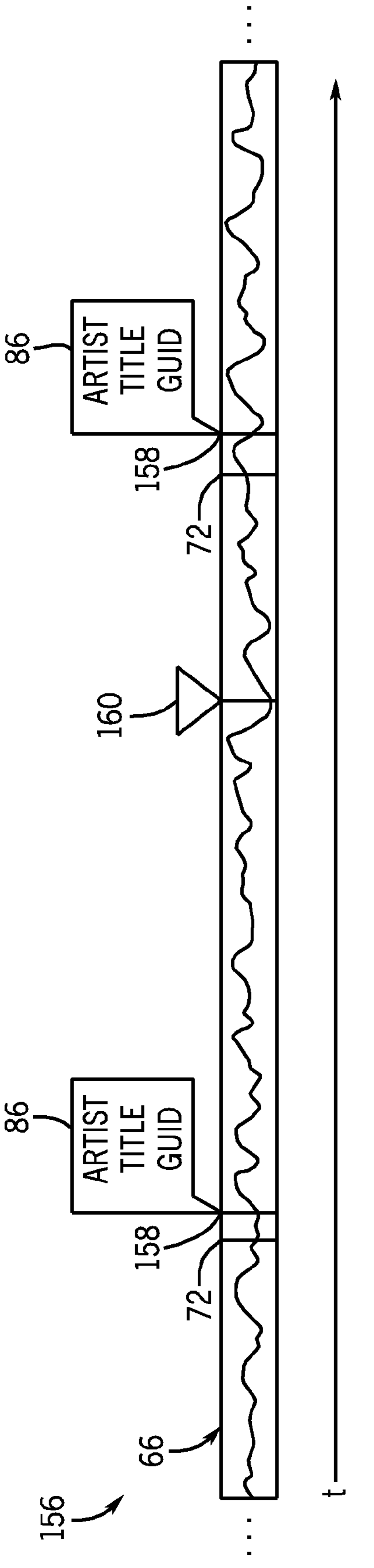
FIG. 14 is a schematic diagram illustrating a manner of reading supplementary digital data encoded into a buffered digital audio stream, in accordance with an embodiment.

Turning to FIG. 14, process 156 represents a manner of playing back digital audio stream 68, when digital audio stream 68 includes ID components 86, in a manner that may identify audio at the point of playback. Specifically, digital audio stream 68 may include ID components 86, illustratively located at points 158. ID components 86 may have been stored at points 158 of digital audio stream 68 according to any suitable technique, including those described above. Points 72, representing the actual starting points for new songs in digital audio stream 68, are illustrated in FIG. 14 to indicate that points 158 may not exactly coincide with the start of new songs.

Playback point 160 may represent a point in time at which a user desires to play back digital audio stream 68. A user may reach playback point 160, for example, by fast forwarding or rewinding through digital audio stream 68. To identify the currently-playing audio at play back point 160, processing may generally involve identifying the closest ID component 86 backwards in time in digital audio stream 68.

Figure 15:
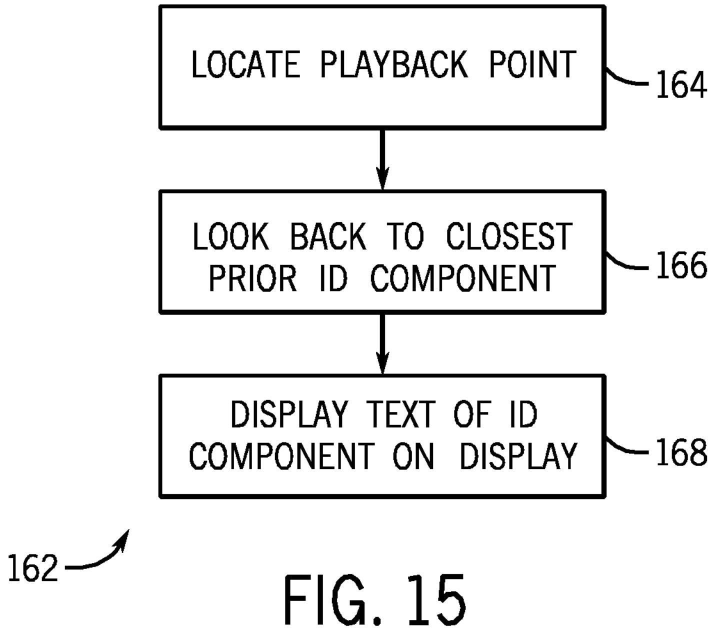
FIGS. 15-18 are flowcharts describing embodiments of methods for playing back a buffered digital audio stream having supplementary digital data encoded within it.

Flow chart 162 of FIG. 15 represents an embodiment of such a method for playing back digital audio stream 68. In step 164, electronic device may locate playback point 160, as may occur when a user fast-forwards or rewinds through digital audio stream 68. In step 166, electronic device 10 may determine which ID component 86 is located most recently in the past in digital audio stream 68. In step 168, electronic device 10 may display the data contained in ID component 86 regarding the currently-playing audio.

The information contained in ID component 86 may be displayed visually, such as on display 18, or may be provided in a digital voiceover while digital audio stream 68 is playing back. Additionally, information from ID component 86 may be used by electronic device 10 to provide further supplementary information regarding the currently-playing audio. In particular, electronic device 10 may access a web service such as iTunes® by Apple Inc. to obtain additional information regarding the currently-playing audio such as album art, artist biography, an artist website hyperlink, and so forth. Moreover, in step 168, electronic device 10 may provide an option to purchase the currently-playing audio based on information contained in ID component 86. In one example, a GUID from ID component 86 may be associated with the currently-playing audio, and may refer to a unique database entry to enable the purchase of the song via iTunes® by Apple Inc.

Figure 16:
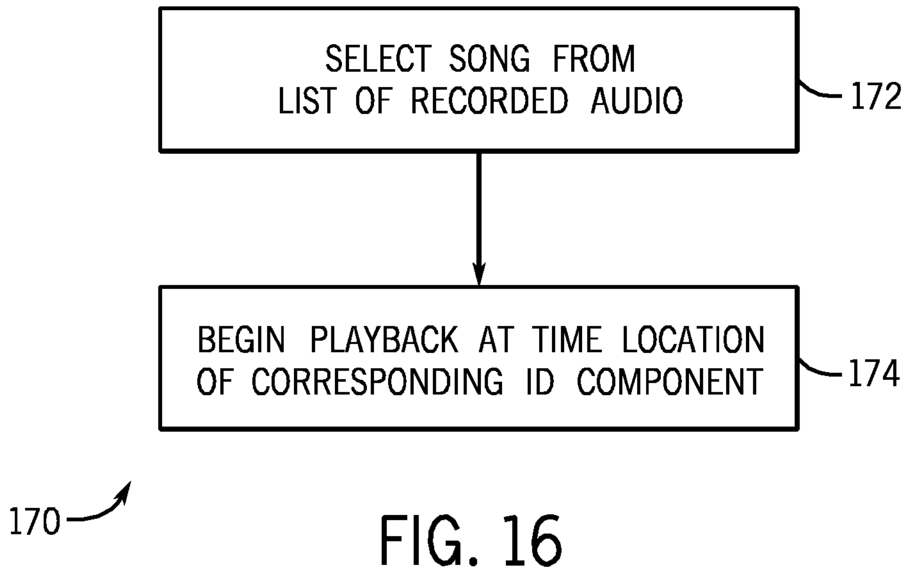
Figure 17:
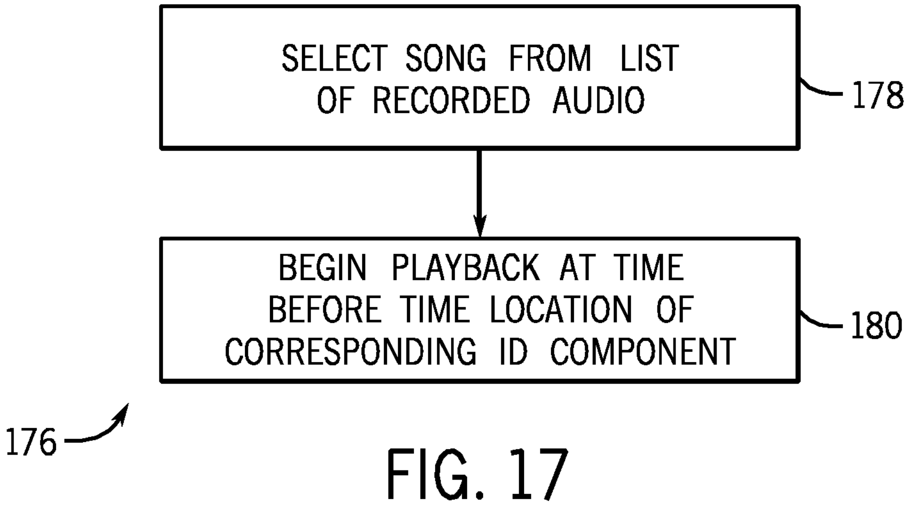
Figure 18:
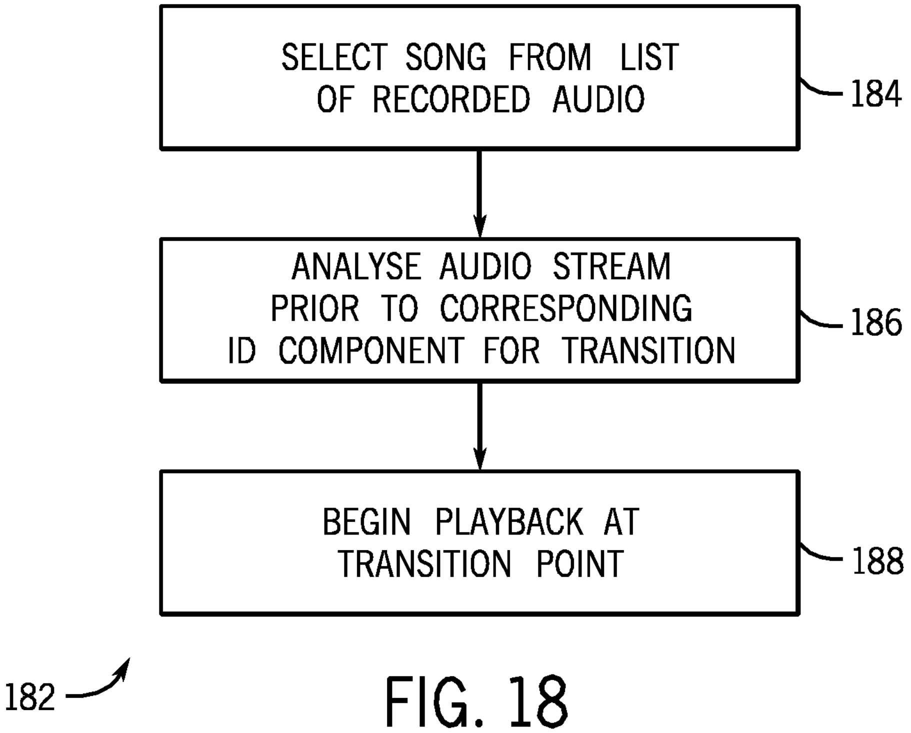

The various ID components 86 inserted into digital audio stream 68 may also enable navigation through digital audio stream 68 to play certain desired songs. For example, as ID components 86 are inserted into digital audio stream 68, the information regarding the placement of such ID components 86 and the information contained therein may be stored in a database in nonvolatile storage 16 of electronic device 10. Thereafter, a user may select audio listed in such a database to begin playback of digital audio stream 68 at or near the start of desired audio. FIGS. 16-18 describe manners of navigating directly to a song identified by an ID component 86 in digital audio stream 68.

Flow chart 170 of FIG. 16 represents a first embodiment of a method for playing back desired audio identified by an ID component 86 in digital audio stream 68. In step 172, a user may select a previously recorded song from a list of audio recorded in digital audio stream 68, based on information contained in ID components 86. The list of audio may correspond to a database, as described above, that links information contained in ID components 86 and the location of the ID components 86 in digital audio stream 68. In step 174, electronic device 10 may begin playing back digital audio stream at the point 158 where the ID component 86 associated with the selected song appears in digital audio stream 68.

As noted above, points 158 in digital audio stream 68, where ID components 86 have been inserted, may not necessarily correspond directly to points 72 in digital audio stream 68, where new songs begin. As such, flowchart 176 of FIG. 17 may present an alternative embodiment of a method for playing back desired audio in digital audio stream 68. First step 178 of flowchart 176 of FIG. 17 may take place in the same manner of step 172 of flow chart 170 of FIG. 16, during which a user may select desired audio in digital audio stream 68, as identified by particular ID component 86.

In step 180, rather than begin playing back digital audio stream 68 at the point 158 corresponding to the particular ID component 86 associated with the selected audio, electronic device 10 may begin playing back digital audio stream 68 at a certain amount of time prior to or after the point 158. In this way, because the point 158 associated with the particular ID component 86 associated with the selected song may not be located exactly at point 72, which represents the true start of new audio in digital audio stream 68, playback may begin at a time that more closely approximates point 72. By way of example, playback may begin approximately 5, 10, 15, 20, 25, or 30 seconds before or after the location of the corresponding ID component 86 in digital audio stream 68. The amount of time may vary depending on the manner in which ID components 86 were inserted into digital audio stream 68.

Flow chart 182 of FIG. 18 describes another embodiment of a method for playing back selected audio in digital audio stream 68. In first step 184, a user may select desired audio from a list of recorded audio, in the same manner as described above with reference to steps 172 and 178 of flowcharts 170 and 176, respectively. In step 186, electronic device 10 may analyze a portion of digital audio stream 68 occurring a certain amount of time prior to or after the point 158 corresponding to the ID component 86 associated with the selected song, to determine a transition point that may more closely approximate point 72 than point 158. Specifically, electronic device 10 may analyze digital audio stream 68 characteristics including, for example, key, beat, and/or frequency changes, which may indicate a transition from one song to another. If such a transition is determined, in step 188, playback of digital audio stream 68 may begin at the transition point determined in step 186.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:

receiving a radio frequency broadcast signal into a radio frequency receiver, the broadcast signal including audio content;

decoding an analog audio signal and a non-audio digital signal from the radio frequency broadcast signal using the radio frequency receiver;

digitizing the analog audio signal into a digital audio stream using an analog to digital converter;

parsing the non-audio digital signal to obtain audio-identifying information using data processing circuitry;

additionally parsing the non-audio digital signal until duplicate audio-identifying information is obtained before collecting the audio-identifying information into a single data component comprising multiple elements of the audio-identifying information decoded from the non-audio digital signal;

using the data processing circuitry, encoding a placeholder into the digital audio stream while parsing the non-audio digital signal; and encoding the data component into the digital audio stream at the placeholder within the digital audio stream using the data processing circuitry, wherein the placeholder is located in the digital audio stream at a point corresponding approximately to the start of new audio content in the digital audio stream.

2. The method of claim 1, wherein the received radio frequency broadcast signal comprises an FM radio broadcast signal.

3. The method of claim 1, wherein the non-audio digital signal is of the Radio Data System format or the Radio Broadcast Data System format, or a combination thereof.

4. The method of claim 1, further comprising encoding an additional placeholder into the digital audio stream at a point corresponding to a time that new audio-identifying information is received, and encoding a data component comprising the new audio-identifying information into the digital audio stream at the additional placeholder.

5. The method of claim 4, further comprising encoding additional placeholder components into the digital audio stream at a regular interval while the non-audio digital signal is being parsed using the data processing circuitry, and additionally encoding the data component comprising the new audio-identifying information into the digital audio stream at one or more of the additional placeholder components.

6. The method of claim 5, further comprising analyzing the digital audio stream while parsing the non-audio digital signal to determine an audio transition point, encoding a transition placeholder into the digital audio stream at the audio transition point using the data processing circuitry, and encoding an additional data component into the digital audio stream at the transition placeholder component.

7. An electronic device comprising:

a radio frequency receiver, to receive a radio frequency broadcast signal including audio content, and to decode an analog audio signal and non-audio digital signal from the audio frequency broadcast signal;

an analog to digital converter coupled with the radio frequency receiver, to digitize the analog audio signal into a digital audio stream;

memory coupled with the analog to digital converter, to buffer the digital audio stream; and data processing circuitry coupled with the memory, wherein the data processing circuitry contains logic to:

parse the non-audio digital signal to obtain audio-identifying information;

additionally parse the non-audio digital signal until duplicate audio-identifying information is obtained;

after the non-audio digital signal is additionally parsed, collect the audio-identifying information into a single data component comprising multiple elements of the audio-identifying information decoded from the non-audio digital signal;

encode a placeholder into the digital audio stream at a point corresponding approximately to the start of new audio content in the digital audio stream; and encode the data component into the digital audio stream at the placeholder.

8. The electronic device of claim 7, wherein the audio-identifying information includes data associated with a currently-playing program of the audio component.

9. The electronic device of claim 8, wherein the data associated with the currently-playing program of the audio component includes broadcast station call letters, an artist name, a title, a global unique identifier, or any combination thereof.

10. The electronic device of claim 9, wherein the radio frequency receiver is an FM radio frequency receiver having a Radio Data System decoder or a Radio Broadcast Data System decoder, or a combination thereof.

11. The electronic device of claim 7, wherein the data processing circuitry is additionally configured to encode placeholder components into the buffered audio stream at a regular interval.

12. The electronic device of claim 11, wherein one of the placeholder components is encoded in the buffered audio stream corresponding approximately to a point at which one of a plurality of data associated with the currently-playing program was received.

13. The electronic device of claim 12, wherein the data processing circuitry is additionally configured to analyze the buffered audio stream to determine an audio transition point, encode a transition placeholder component at the audio transition point, and place the identification component into the placeholder component.

14. A system for processing data supplementary to audio received in a radio buffer, the system comprising:

a radio frequency receiver, to receive a radio frequency broadcast signal including audio content, and to decode the broadcast signal into an audio signal and a non-audio signal;

an analog to digital converter coupled with the radio frequency receiver, wherein the audio signal is an analog audio signal, and wherein the analog to digital converter is to digitize the audio signal into a digital audio stream;

memory coupled to the analog to digital converted, to buffer the digital audio stream; and data processing circuitry coupled to the memory, to parse a non-audio signal received from the radio buffer into an audio-identifying component, encode a placeholder into the audio stream at a point corresponding approximately to the start of new audio content in the audio stream, and encode the audio-identifying component into the audio stream at the placeholder, wherein the data processing circuitry parses the non-audio signal via logic configured to:

parse the non-audio signal to obtain audio-identifying information;

additionally parse the non-audio signal until duplicate audio-identifying information is obtained;

after the additional parsing, collect the audio-identifying information into a single data component comprising multiple elements of the audio-identifying information decoded from the non-audio signal;

encode a placeholder into the audio stream at a point corresponding approximately to the start of new audio content in the audio stream; and encode the data component into the audio stream at the placeholder.

15. The system of claim 14, wherein the data processing circuitry is additionally configured to encode placeholder components into the buffered audio stream at a regular interval.

* * * * *